United States Patent
Muramatsu

(10) Patent No.: US 10,967,917 B2
(45) Date of Patent: Apr. 6, 2021

(54) PANEL STRUCTURE

(71) Applicant: HONDA MOTOR CO., LTD., Tokyo (JP)

(72) Inventor: Yuki Muramatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 15/227,487

(22) Filed: Aug. 3, 2016

(65) Prior Publication Data

US 2017/0043812 A1 Feb. 16, 2017

(30) Foreign Application Priority Data

Aug. 10, 2015 (JP) .............................. JP2015-158486

(51) Int. Cl.
*B62D 25/20* (2006.01)
*B62D 25/00* (2006.01)

(52) U.S. Cl.
CPC ............. *B62D 25/20* (2013.01); *B62D 25/00* (2013.01)

(58) Field of Classification Search
CPC ........ B62D 25/20; B62D 25/00; B62D 33/00; B62D 21/00; B62D 23/00; B62D 25/2009–2045; B65D 25/00; B65D 21/00
USPC .................................................... 296/193.07
See application file for complete search history.

(56) References Cited

U.S. PATENT DOCUMENTS

| | | | | |
|---|---|---|---|---|
| 4,609,252 A * | 9/1986 | Wong | .................... | G02B 6/2804 385/130 |
| 7,407,223 B2 * | 8/2008 | Ito | ...................... | B62D 25/2036 296/193.07 |
| 8,544,940 B2 * | 10/2013 | Kowalski | ............... | B62D 25/20 296/1.03 |
| 9,822,879 B2 | 11/2017 | Schmitt et al. | | |
| 2004/0013953 A1 * | 1/2004 | Mune | ....................... | C08K 5/06 430/18 |
| 2006/0163914 A1 * | 7/2006 | Kamura | ............. | B62D 25/2036 296/193.07 |
| 2009/0013633 A1 * | 1/2009 | Aubuchon | ............. | B21D 13/02 52/634 |
| 2011/0000161 A1 * | 1/2011 | Aube | ........................ | E04B 2/46 52/563 |
| 2011/0069001 A1 * | 3/2011 | Lee | ....................... | G02B 26/026 345/107 |
| 2011/0147931 A1 * | 6/2011 | Nondhasitthichai | ........................ | H01L 21/568 257/738 |
| 2012/0141750 A1 * | 6/2012 | Taylor | ................. | B32B 38/0004 428/201 |

(Continued)

FOREIGN PATENT DOCUMENTS

| | | |
|---|---|---|
| CA | 2 888 319 A1 | 4/2014 |
| JP | H06-107234 A | 4/1994 |

(Continued)

OTHER PUBLICATIONS https://www.splashmath.com/math-vocabulary/geometry/hexagon.*

(Continued)

*Primary Examiner* — Laura C Powers
(74) *Attorney, Agent, or Firm* — Carrier Blackman & Associates, P.C.; William D. Blackman; Joseph P. Carrier

(57) ABSTRACT

The independent Y-shaped bead 10 is provided on the panel P with a planar shape. The bead 10 includes the plurality of branching portions 10a, 10b, and 10c radially extending from the intersection R3 at an equal interval.

20 Claims, 6 Drawing Sheets

(56) References Cited

U.S. PATENT DOCUMENTS

2018/0036819 A1* 2/2018 Miyazaki .............. B23K 3/029

FOREIGN PATENT DOCUMENTS

| | | |
|---|---|---|
| JP | H06-297488 A | 10/1994 |
| JP | 2000-016348 A | 1/2000 |
| JP | 2006-240586 A | 9/2006 |
| JP | 2007-069888 A | 3/2007 |
| JP | 2012-530888 A | 12/2012 |
| JP | 2013-169237 A | 9/2013 |

OTHER PUBLICATIONS https://en.wikipedia.org/wiki/Hexagon.*
Chinese Office Action dated Mar. 6, 2018 issued in the corresponding CN Patent Application 201610648780.X with a partial English translation thereof.
Office Action dated Oct. 26, 2018 issued in the corresponding Japanese Patent Application 2015-158486 with a partial English translation thereof.
Japanese Office Action dated May 20, 2019 issued in the corresponding Patent Application No. JP2015-158486 with a partial English translation thereof.

* cited by examiner

FIG. 4A
FIG. 4B
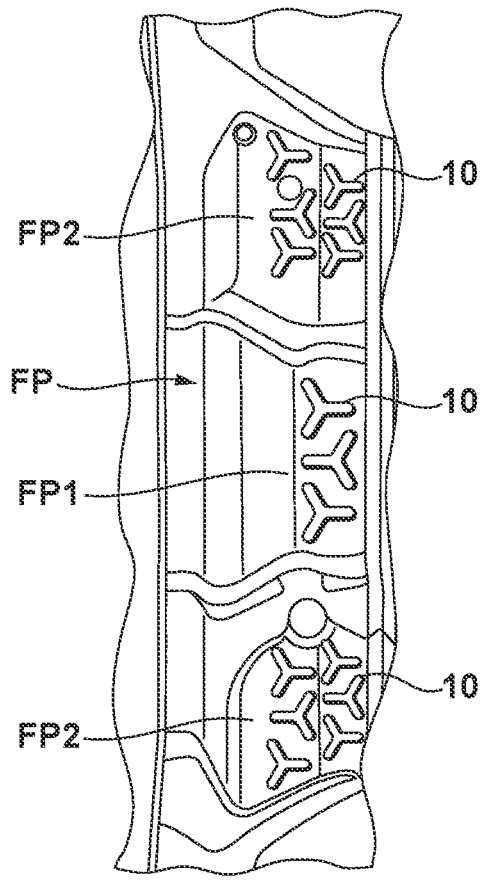
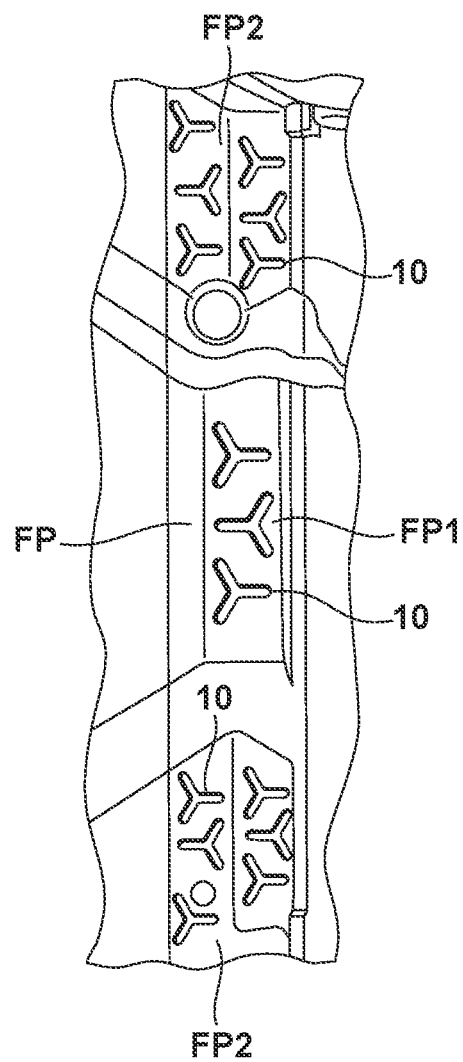

PANEL STRUCTURE

BACKGROUND OF THE INVENTION

Field of the Invention

The present invention relates to a panel structure provided with beads.

Description of the Related Art

The floor panel of an automobile or the like is provided with beads that vertically and horizontally intersect each other. This can increase the rigidity of the floor panel to the bending mode of a car body in the side-to-side and back-and-forth directions and reduce a vibration/noise (Japanese Patent Laid-Open No. 6-107234).

In Japanese Patent Laid-Open No. 6-107234, however, since the beads are provided on the entire floor panel, the comfortableness of the floor, difficulty in sheet mounting, and the manufacturing cost are susceptible to improvement.

Additionally, in Japanese Patent Laid-Open No. 6-107234, since loads concentrate to a portion where a vertical bead and a horizontal bead intersect, a starting point of a break or bending is formed. Furthermore, no bead can be provided on a narrow area portion of the planar portion of the panel.

Note that to ensure the rigidity of the panel or the comfortableness of the floor, a vibration and noise need to be suppressed by increasing the board thickness of the floor panel or attaching/applying an anti-vibration material (melting sheet), resulting in an increase in the weight.

SUMMARY OF THE INVENTION

The present invention has been made in consideration of the aforementioned problems, and realizes a panel structure capable of increasing rigidity to loads from every direction and reduce a vibration/noise with a simple arrangement.

In order to solve the aforementioned problems, the first aspect of the present invention provides a panel structure, wherein an independent Y-shaped bead is provided on a panel with a planar shape.

According to the present invention, it is possible to realize a panel structure capable of increasing rigidity to loads from every direction and reduce a vibration/noise with a simple arrangement.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4A is an enlarged view of the floor panel shown in FIG. 3 viewed from the upper side;

FIG. 4B is an enlarged view of the floor panel shown in FIG. 3 viewed from the lower side;

DESCRIPTION OF THE EMBODIMENTS

An embodiment of the present invention will now be described in detail with reference to the accompanying drawings.

Examination of Beads in Various Shapes

Figure 1A:
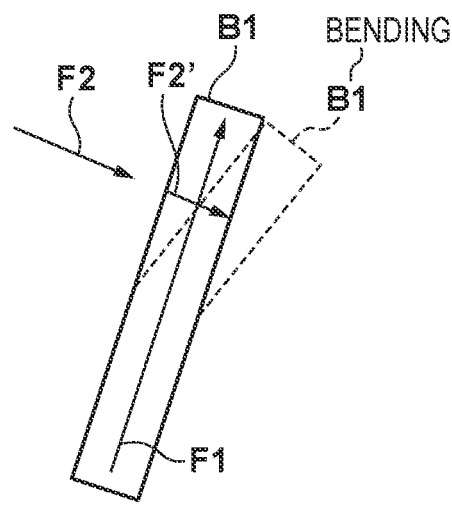
FIGS. 1A to 1C are views for explaining the problems of beads in various shapes.
Figure 1B:
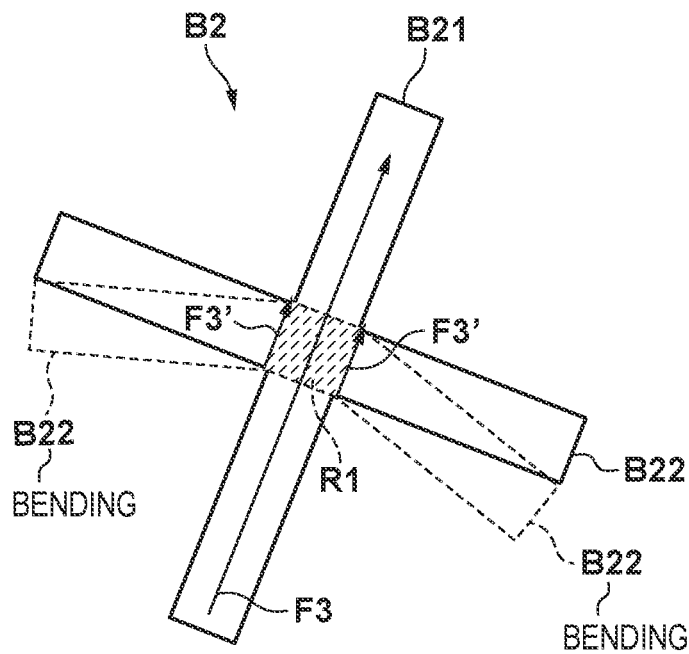
Figure 1C:
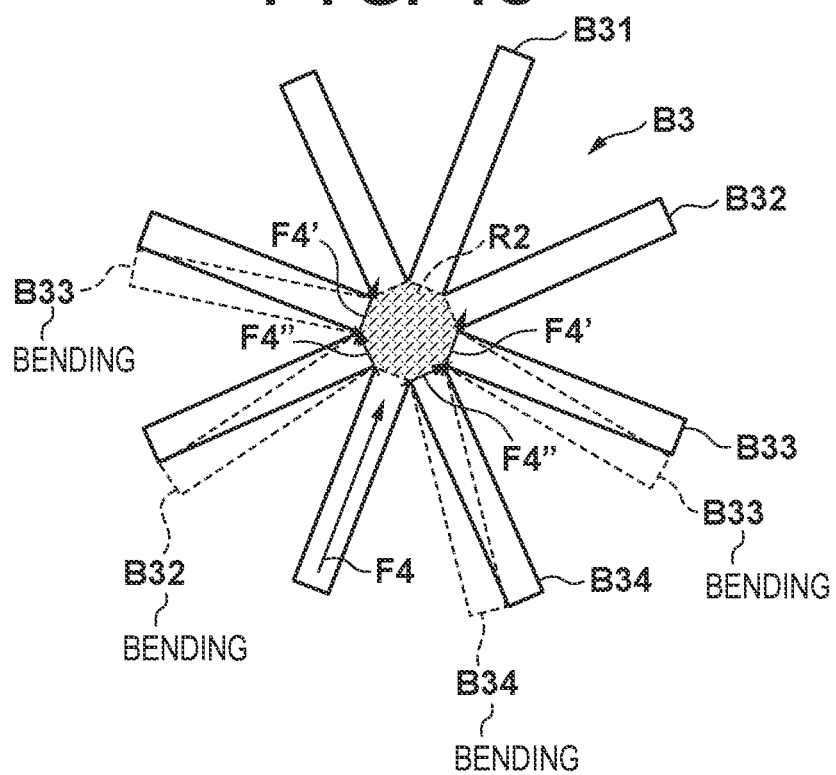

The problems of beads in various shapes will be examined first with reference to FIGS. 1A to 1C.

As shown in FIG. 1A, in a case in which a bead B1 has a linear shape, if a load F1 is input from a direction along the linear portion of the bead B1, the bead B1 disperses the load F1 and contributes to an increase in rigidity. However, a load F2' input by a load F2 from a direction perpendicular to (intersecting) the linear portion of the bead B1 causes a bending.

As shown in FIG. 1B, in a case in which a bead B2 has a cross shape, if a load F3 is input from a direction along the linear portion of one bead B21, a load F3' acting on the boundary to the other bead B22 that is perpendicular to (intersects) the bead B21 causes a bending.

In addition, the larger the area of an intersecting portion R1 of the two beads B21 and B22 is, more readily a break occurs if the strength of the intersecting portion R1 is insufficient. That is, the intersecting portion R1 is the portion to which the loads from the two beads B21 and B22 concentrate. The intersecting portion R1 has a flat shape projecting upward, and the two beads B21 and B22 intersect there. For this reason, if the board is thin, the strength is short, resulting in fracture.

As shown in FIG. 1C, in a case in which a plurality of (for example, four) beads B31, B32, B33, and B34 intersect at an almost equal interval, a load F4' acting on the boundary between the bead B31 to which the load is input and the bead B33 that is perpendicular to (intersects) the bead B33 readily causes a bending, as in the cross-shaped bead B2 shown in FIG. 1B. In addition, when a load F4 is input to the bead B31, the number of beads (beads B33 and B34) that receive the load F4' and F4" dispersed from the load F4 increases. Since the load becomes larger than in the cross-shaped bead, and the area of the flat surface of an intersecting portion R2 further increases, a break readily occurs.

Bead Shape of Embodiment

Figure 2A:
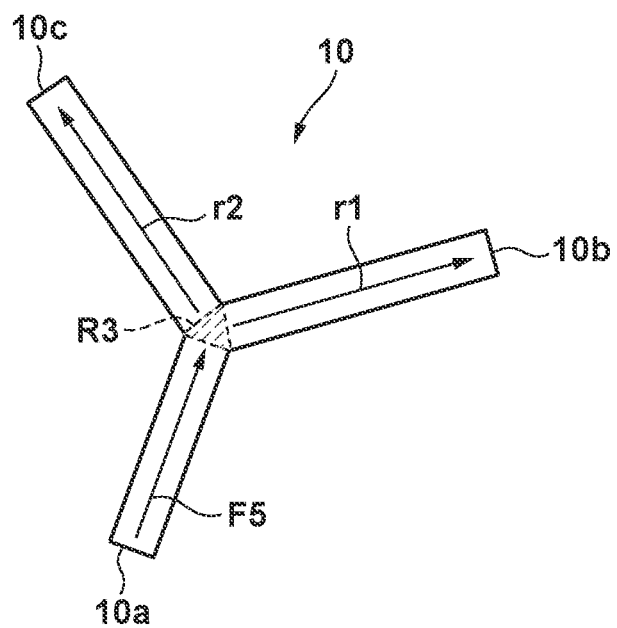
FIGS. 2A to 2C are views for explaining a bead shape according to the embodiment.

Based on the above examination, in this embodiment, a bead 10 is formed into an almost Y shape or an almost trifurcated shape, as schematically illustrated in FIG. 2A. When the Y-shaped bead is employed, transmission paths r1 and r2 to disperse a load F5 input to one (a branching portion 10a in FIG. 2A) of the three branching portions are ensured by remaining branching portions 10b and 10c. In addition, since the branching portions of the bead are not perpendicular to each other, a load input to one branching portion is never input to the boundary to the remaining branching portions from a direction perpendicular to them. Hence, the bead is less bendable than the cross-shaped bead B2 shown in FIG. 1B. Furthermore, since an intersecting portion R3 has a triangular shape, and its area is ½ the area of the intersecting portion R1 of the cross-shaped bead B2 (if the bead width is the same), the bead hardly breaks even if the board thickness of the flat portion is small.

Figure 2B:
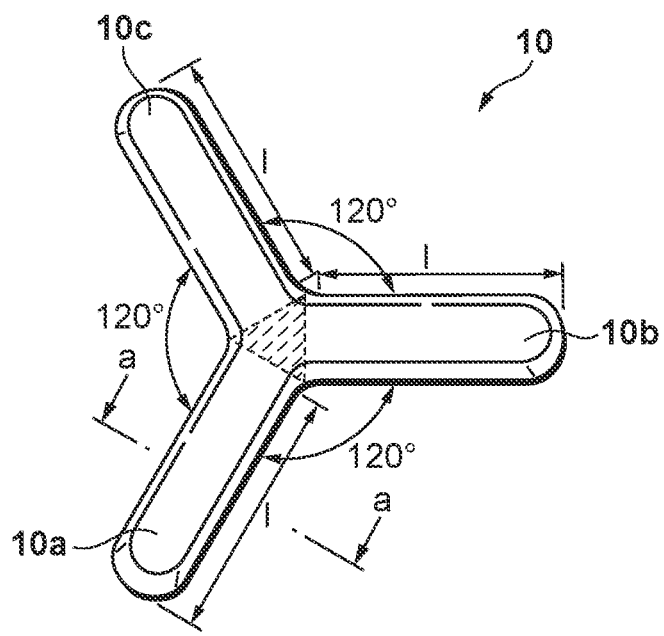
Figure 2C:
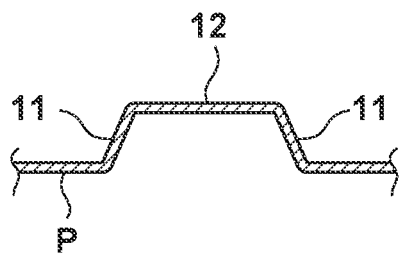

More specifically, as shown in FIG. 2B, the Y-shaped bead 10 includes the three branching portions 10a, 10b, and 10c radially extending from the intersecting portion (intersection) R3 at an equal interval. The branching portions 10a, 10b, and 10c extend in an almost equal length from the intersecting portion R3 at an interval of about 120°. As shown in the sectional view of FIG. 2C taken along a line a-a in FIG. 2B, each of the branching portions 10a, 10b, and 10c has a sectional shape projecting upward in the board thickness direction, and includes slope portions 11 standing obliquely upward from a panel P with a planar shape so as to form an inverted V shape, and a flat top portion 12 that defines the upper ends of the slope portions 11. Note that the Y-shaped bead need only have a trifurcated shape, and the length of the branching portions can arbitrarily be set.

When the Y-shaped beads 10 are arranged at an equal interval, the rigidity of the panel P can efficiently be improved. In addition, a plurality of beads can be arranged at an arbitrary density on a portion of a narrow area, as will be described later with reference to FIG. 6.

Furthermore, when the branching portions 10a, 10b, and 10c of the Y-shaped bead 10 have an almost equal length, the rigidity can evenly be increased, and the plurality of beads can easily be arranged.

Floor Structure of Embodiment

An arrangement that provides the independent Y-shaped beads 10 on the floor panel of an automobile will be described below as a floor structure according to the present invention. As used herein, the term "independent" is intended to mean that the beads 10 are separate and distinct from one another, in a manner as shown in the drawings, rather than being interconnected and in contact with one another.

Figure 3:
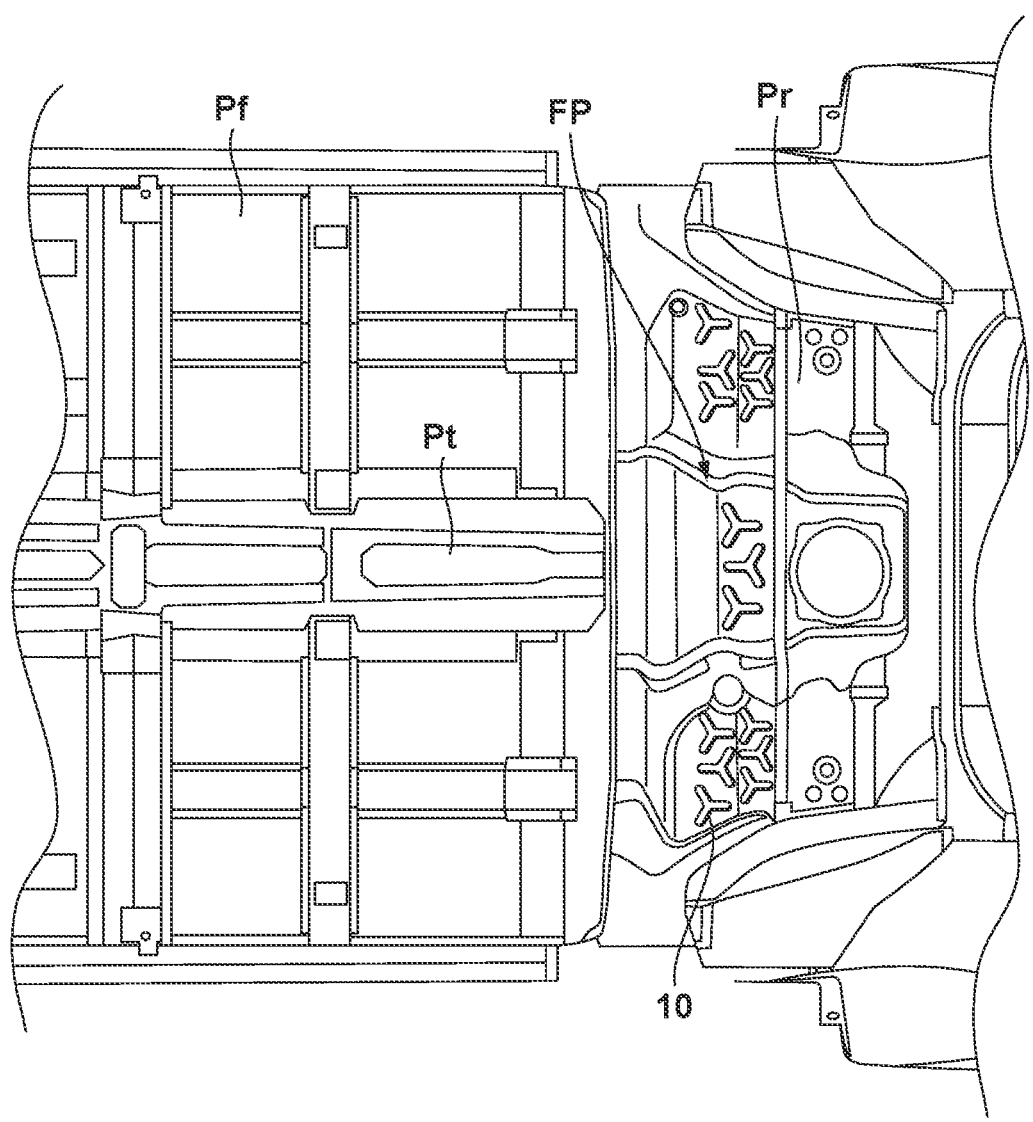
FIG. 3 is a plan view showing the floor panel structure of an automobile according to the embodiment.

FIG. 3 is a plan view showing the floor panel structure of an automobile according to the embodiment. FIG. 4A is an enlarged view of the floor panel shown in FIG. 3 viewed from the upper side. FIG. 4B is an enlarged view of the floor panel shown in FIG. 3 viewed from the lower side.

As shown in FIGS. 3, 4A, and 4B, a floor panel FP made of a metal steel sheet for an automobile forms the rear portion of a front floor panel Pf, and is located in front of a rear floor panel Pr and under the rear seat in the car.

The floor panel FP includes a first panel FP1 located at the center in the car width direction, and second panels FP2 located on both of the left and right sides of the first panel FP1 in the car width direction. The first panel FP1 and the second panels FP2 continue with steps in the vertical direction.

The floor panel FP is connected to the rear floor panel Pr located on the back side of the car body. The first panel FP1 has a shape rising upward so as to continue to a center tunnel Pt extending in the back-and-forth direction at the center of the front floor panel Pf in the car width direction.

The plurality of Y-shaped beads 10 are provided on each of the planar portions of the first panel FP1 and the second panels FP2 while being spaced apart from each other.

As in this embodiment, when the Y-shaped beads 10 are provided on the floor panel FP on which the seat surface of the rear seat is arranged, the surface rigidity of the panel increases, and the rigidity to loads input to the floor panel from various directions such as the side-to-side and back-and-forth directions can be increased by the simple structure without sacrificing the comfortableness of the floor in the car. In addition, the increase in the surface rigidity contributes to reduction of a vibration/noise.

When the bead 10 has a Y shape, a break at the intersecting portion R1 or R2 where the beads intersect or a bending starting from the intersecting portion R1 or R2 as described with reference to FIGS. 1A to 1C hardly occurs.

When the individual beads 10 are provided while being spaced apart without connection, the beads can be prevented from being connected and deformed. In addition, the beads can easily be arranged even on a narrow part or edge of the floor panel, as will be described later with reference to FIGS. 5 and 6.

Note that there is advantage from the viewpoint of the manufacturing step because the beads 10 can be molded simultaneously as the press molding of the floor panel FP.

Many loads are input to the automobile from various directions, for example, from the road surface at the time of traveling or from the engine. In addition, the automobile is particularly required to be lightweight because of the restriction of fuel consumption or the like.

To meet this requirement, the Y-shaped beads 10 are provided on the metal steel sheet that makes the floor panel of the automobile so as to increase the surface rigidity to various directions to input the loads and decrease the board thickness or melting sheet application amount, thereby contributing to weight reduction.

Figure 5:
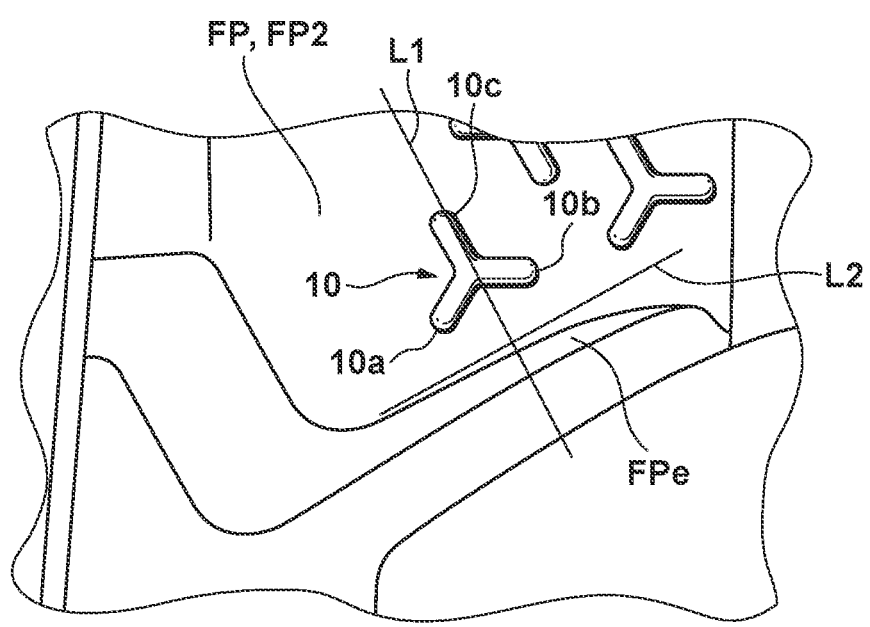
FIG. 5 is a view for explaining an example of the arrangement of the beads according to the embodiment.

Additionally, for example, when providing the Y-shaped beads 10 on an edge portion FPe of the second panel FP2 of the floor panel FP, as shown in FIG. 5, an extension line L1 of the branching portion 10c located farthest from the edge portion FPe is arranged to be almost perpendicular to a ridge line L2 of the edge portion FPe, thereby giving sufficient surface rigidity up to the edge portion FPe of the floor panel FP.

Figure 6:
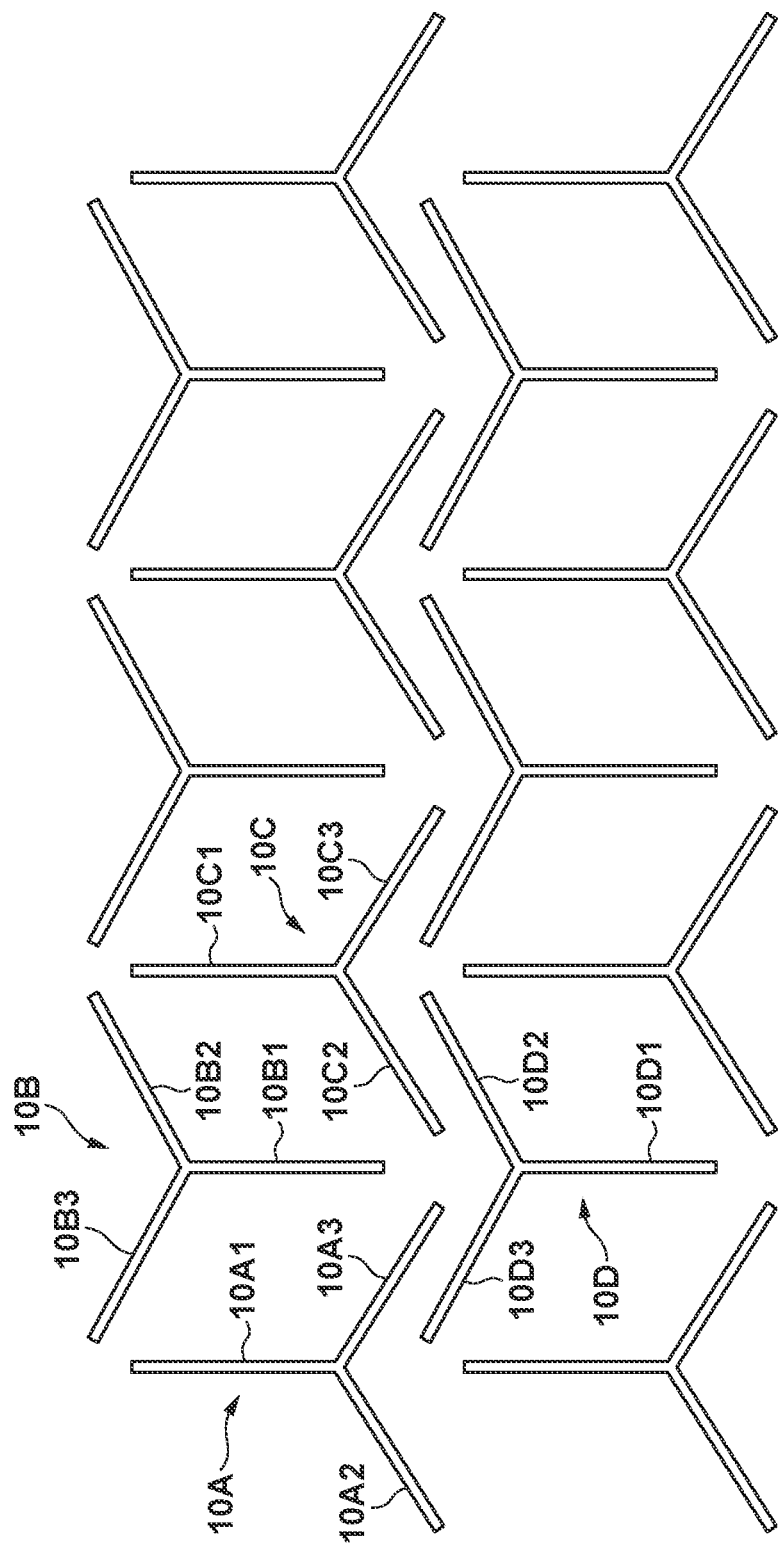
FIG. 6 is a view for explaining an example of the arrangement of the beads according to the embodiment.

In particular, when arranging the plurality of Y-shaped beads 10 on a narrow part, the directions of beads 10A, 10B, 10C, and 10D adjacent to each other are inverted by 180° so as to attain a positional relationship in which the branching portions facing each other between adjacent beads become parallel, as shown in FIGS. 4A, 4B and 6. In the example of FIG. 6, the beads are arranged to attain a positional relationship in which branching portions 10A1 and 10B1 and branching portions 10A3 and 10B3 are parallel between adjacent beads 10A and 10B, branching portions 10B2 and 10C2 and branching portions 10B1 and 10C1 are parallel between the adjacent beads 10B and 10C, and the branching portions 10A3 and 10D3 and the branching portions 10C2 and 10D2 are parallel between the adjacent beads 10A, 10C, and 10D.

Since the adjacent beads can thus be arranged in a staggered pattern, the plurality of beads can easily be arranged even on a portion of a narrow area, and the surface rigidity to loads from various directions can be increased.

In addition, since the number or density of beads can arbitrarily be changed in accordance with the planar shape of the panel, the beads can efficiently be arranged even if a hole or the like exists in the panel regardless of the planar shape of the panel.

The above-described embodiment is an example for implementing the present invention, and the present invention is applicable to a change or modification of the embodiment without departing from the spirit and scope thereof.

In this embodiment, the beads are provided on the floor panel for an automobile. However, the present invention is not limited to this, and may be applied to another panel member or any other member such as a frame member that needs rigidity, or for an application purpose other than the automobile.

SUMMARY OF EMBODIMENT

Arrangement 1

The independent Y-shaped bead 10 is provided on the panel P with a planar shape.

According to arrangement 1, it is possible to increase rigidity to loads from every direction and reduce a vibration/noise with a simple arrangement.

Arrangement 2

In arrangement 1, the bead 10 includes the plurality of branching portions 10*a*, 10*b*, and 10*c* radially extending from the intersection R3 at an equal interval.

According to arrangement 2, the surface rigidity of the panel can evenly efficiently be increased.

Arrangement 3

In arrangement 2, the branching portions 10*a*, 10*b*, and 10*c* extend from the intersection R3 at an interval of about 120°.

According to arrangement 3, the surface rigidity of the panel can evenly efficiently be increased.

Arrangement 4

In arrangement 2 or 3, the branching portions 10*a*, 10*b*, and 10*c* extend from the intersection R3 in an almost equal length.

According to arrangement 4, the surface rigidity can evenly be increased, and a plurality of beads can be arranged at a high density on a portion of a narrow area.

Arrangement 5

In any one of arrangements 1 to 4, in the edge portion FPe of the panel P on which the bead 10 is provided, the extension line L1 of the branching portion 10*c* farthest from the edge portion FPe is arranged to be almost perpendicular to the ridge line L2 of the edge portion FPe.

According to arrangement 5, it is possible to give sufficient surface rigidity up to the edge portion of the panel.

Arrangement 6

In any one of arrangements 1 to 5, when providing the plurality of beads 10 on the panel P, the beads are arranged by inverting the directions of beads adjacent to each other by 180°.

According to arrangement 6, the plurality of beads can easily be arranged even on a portion of a narrow area, and the surface rigidity to loads from various directions can be increased.

Arrangement 7

In any one of arrangements 1 to 6, the panel P is the floor panel FP for an automobile, which is made of a metal.

According to arrangement 7, the rigidity to loads input to the floor panel from various directions can be increased by the simple structure without sacrificing the comfortableness of the floor in the car to increase the rigidity of the floor panel. In addition, when the rigidity of floor panel increases, a vibration or noise can be reduced.

The present invention is not limited to the above embodiments and various changes and modifications can be made within the spirit and scope of the present invention. Therefore, to apprise the public of the scope of the present invention the following claims are made.

This application claims the benefit of Japanese Patent Application No. 2015-158486, filed Aug. 10, 2015, which is hereby incorporated by reference herein in its entirety.

What is claimed is:

1. A panel structure for an automobile, the panel structure being comprised of a front floor panel, a center floor panel and a rear floor panel, wherein the center floor panel is substantially planar and wherein a plurality of independent Y-shaped beads are provided on the center floor panel, and wherein:

the center floor panel is configured to support a rear seat thereon, the center floor panel is located between the front floor panel and the rear floor panel, the center floor panel is extended upward and rearward from a rear end of a center tunnel provided in the front floor panel, the center floor panel comprises a first panel section at the center in the vehicle width direction and second panel sections on both sides of the first panel section, and the Y-shaped beads are provided on the first panel section and the second panel sections.

2. The panel structure according to claim 1, wherein each of the Y-shaped beads includes a plurality of branching portions extending radially from an intersection at an equal interval.

3. The panel structure according to claim 2, wherein the branching portions extend from the intersection at an interval of about 120 degrees.

4. The panel structure according to claim 2, wherein the branching portions extend from the intersection in an equal length.

5. The panel structure according to claim 2, wherein in a rear edge portion of the center floor panel on which the Y-shaped bead is provided, an extension line of a branching portion farthest from the rear edge portion is arranged to be perpendicular to a ridge line of the rear edge portion.

6. The panel structure according to claim 1, wherein a plurality of the Y-shaped beads are provided on the center floor panel, and wherein the Y-shaped beads are arranged by inverting directions of beads adjacent to each other by 180 degrees.

7. The panel structure according to claim 1, wherein each of the front floor panel, the center floor panel and the rear floor panel comprises a metal.

8. The panel structure according to claim 1, wherein a first Y-shaped bead and a second Y-shaped bead are arranged adjacent to each other, a first branching portion of the first Y-shaped bead and a first branching portion of the second Y-shaped bead are arranged in parallel to face each other, and a second branching portion of the first Y-shaped bead and a second branching portion of the second Y-shaped bead are arranged in parallel to face each other.

9. A panel structure for an automobile, the panel structure being comprised of a front floor panel, a center floor panel and a rear floor panel, wherein the center floor panel is substantially planar and wherein respective independent Y-shaped beads are provided on the center floor panel, and wherein:

the center floor panel is configured to support a rear seat thereon, the center floor panel is located between the front floor panel and the rear floor panel, the center floor panel is extended upward and rearward from a rear end of a center tunnel provided in the front floor panel, the center floor panel comprises a first panel section at the center in the vehicle width direction and second panel sections on both sides of the first panel section, the Y-shaped beads on the center floor panel are provided on the first panel section and the second panel sections, the number of the Y-shaped beads provided in the second panel section is greater than the number of the Y-shaped beads provided in the first panel section, the first panel section has one row of the Y-shaped beads, the row extending in a back-and-forth direction of the vehicle body, and the second panel section has two rows of the Y-shaped beads, the rows of the second panel sections extending in the back-and-forth direction of the vehicle body.

10. The panel structure according to claim 9, wherein each of the Y-shaped beads includes a plurality of branching portions extending radially from an intersection at an equal interval.

11. The panel structure according to claim 10, wherein the branching portions extend from the intersection at an interval of about 120 degrees.

12. The panel structure according to claim 10, wherein the branching portions extend from the intersection in an equal length.

13. The panel structure according to claim 10, wherein in a rear edge portion of the center floor panel on which the Y-shaped bead is provided, an extension line of a branching portion farthest from the rear edge portion is arranged to be perpendicular to a ridge line of the rear edge portion.

14. The panel structure according to claim 9, wherein a plurality of the Y-shaped beads are provided on the center floor panel, the Y-shaped beads are arranged by inverting directions of beads adjacent to each other by 180 degrees, and a pair of the branching portions of the adjacent Y-shaped beads are arranged to be parallel and one of the branching portions of the adjacent Y-shaped beads partially overlaps the other of the branching portions of the adjacent Y-shaped beads in a direction perpendicular to the branching portions of the adjacent Y-shaped beads.

15. The panel structure according to claim 9, wherein each of the front floor panel, the center floor panel and the rear floor panel comprises a metal.

16. The panel structure according to claim 9, wherein a first Y-shaped bead and a second Y-shaped bead are arranged adjacent to each other, a first branching portion of the first Y-shaped bead and a first branching portion of the second Y-shaped bead are arranged in parallel to face each other, and a second branching portion of the first Y-shaped bead and a second branching portion of the second Y-shaped bead are arranged in parallel to face each other.

17. The panel structure of claim 4, wherein the center floor panel has a plurality of rows of Y-shaped beads thereon, each of the rows having a plurality of Y-shaped beads therein.

18. The panel structure of claim 4, wherein a plurality of the Y-shaped beads are arranged proximate one another on the center floor panel such that a minimum distance between two adjacent beads out of said plurality of Y-shaped beads is less than the length of one of said branching portions.

19. The panel structure of claim 1, wherein the center floor panel is formed from a single material.

20. The panel structure of claim 17, wherein a minimum distance between two adjacent beads out of said plurality of Y-shaped beads is less than the length of one of said branching portions.

* * * * *